(12) United States Patent
Yonezawa et al.

(10) Patent No.: US 8,467,137 B2
(45) Date of Patent: Jun. 18, 2013

(54) IMAGING LENS UNIT

(75) Inventors: Tomohiro Yonezawa, Sukagawa (JP); Masaya Hashimoto, Sukagawa (JP)

(73) Assignee: Kantatsu Co., Ltd., Yaita-shi, Tochigi (JP)

( * ) Notice: Subject to any disclaimer, the term of this patent is extended or adjusted under 35 U.S.C. 154(b) by 0 days.

(21) Appl. No.: 13/219,126

(22) Filed: Aug. 26, 2011

(65) Prior Publication Data

US 2012/0218647 A1 Aug. 30, 2012

(30) Foreign Application Priority Data

Feb. 28, 2011 (JP) .................. 2011-041734

(51) Int. Cl.
- *G02B 3/02* (2006.01)
- *G02B 13/18* (2006.01)
- *G02B 9/60* (2006.01)

(52) U.S. Cl.
USPC .......................... 359/714; 359/764

(58) Field of Classification Search
USPC ................................ 359/714, 764
See application file for complete search history.

(56) References Cited

U.S. PATENT DOCUMENTS

| 2011/0013069 A1* | 1/2011 | Chen .............................. 348/335 |
| 2011/0134305 A1 | 6/2011 | Sano et al. |
| 2012/0069455 A1 | 3/2012 | Lin et al. |

FOREIGN PATENT DOCUMENTS

| JP | 2007-264180 A | 10/2007 |
| JP | 2007-298572 A | 11/2007 |

* cited by examiner

*Primary Examiner* — William Choi
(74) *Attorney, Agent, or Firm* — Westerman, Hattori, Daniels & Adrian, LLP

(57) ABSTRACT

A compact low-cost imaging lens unit for a solid-state image sensor which corrects various aberrations adequately and produces a high-resolution high-definition image. The components of the unit are arranged from an object side to an image side in the following order: an aperture stop, a first lens with positive refractive power having a convex surface facing the object side, a second lens with negative refractive power having a convex surface facing the object side near an optical axis, a third lens with negative refractive power having a convex surface facing the object side near the optical axis, a fourth lens as a meniscus lens with positive refractive power having a convex surface facing the image side near the optical axis; and a fifth lens with negative refractive power having a concave surface facing the image side near the optical axis.

14 Claims, 12 Drawing Sheets

IMAGING LENS UNIT

The present application is based on and claims priority of Japanese patent application No. 2011-041734 filed on Feb. 28, 2011, the entire contents of which are hereby incorporated by reference.

BACKGROUND OF THE INVENTION

1. Field of the Invention

The present invention relates to imaging lens units for solid-state image sensors which are used in small imaging devices used in small low-profile electronic devices such as mobile terminals including mobile phones and hand-held games and PDAs (Personal Digital Assistance).

2. Description of the Related Art

With the recent expansion of the market for mobile terminals with imaging devices, the use of a high-resolution small solid-state image sensor in an imaging device has been spreading.

With the growing tendency for smaller and higher resolution image sensors, imaging lens units are required to provide higher performance in terms of resolution and image quality. Also, with the spread of such lens units, there has been demand for less costly imaging lens units.

An imaging lens unit including more than one lens has been widely used in order to meet the demand for higher performance and there has been proposed an imaging lens unit including five lenses which is more suitable for performance enhancement than an imaging lens unit including three or four lenses.

For example, JP-A No. 2007-264180 (Patent Document 1) discloses an imaging lens unit intended to provide higher performance, which includes the following constituent lenses arranged from the object side in the following order: a first lens with positive refractive power whose object side surface is convex, a second lens as a meniscus lens with negative refractive power whose concave surface faces the image side, a third lens as a meniscus lens with positive refractive power whose convex surface faces the image side, a fourth lens with negative refractive power whose surfaces are both aspheric with its image side surface concaved near the optical axis, and a fifth lens with positive or negative refractive power whose surfaces are both aspheric.

JP-A No. 2007-298572 (Patent Document 2) discloses an imaging lens unit intended to provide higher performance, which includes the following components arranged from the object side in the following order: an aperture stop, a first lens with positive refractive power, a second lens with negative refractive power bonded to the first lens, a third lens as a meniscus lens with its concave surface facing the object side, a fourth lens as a meniscus lens with its concave surface facing the object side, and a fifth lens as a meniscus lens having at least one aspheric surface with its convex surface facing the object side.

For the imaging lens units described in Patent Documents 1 and 2, which use five lenses for performance enhancement, it is difficult to achieve both miniaturization and adequate aberration correction because the total lens system length is large. In addition, since they use a glass material, it is not easy to reduce the cost.

SUMMARY OF THE INVENTION

The present invention has been made in view of the above circumstances and has an object to provide an imaging lens unit for a solid-state image sensor which features miniaturization, high performance and low cost.

According to an aspect of the present invention, there is provided an imaging lens unit for a solid-state image sensor in which the components are arranged from an object side to an image side in the following order: an aperture stop; a first lens with positive refractive power having a convex surface facing an object side; a second lens with negative refractive power having a convex surface facing the object side near an optical axis; a third lens with negative refractive power having a convex surface facing the object side near the optical axis; a fourth lens as a meniscus lens with positive refractive power having a convex surface facing the image side near the optical axis; and a fifth lens with negative refractive power having a concave surface facing the image side near the optical axis.

In the above imaging lens unit, the first and second lenses are mainly responsible for generation of required power and correction of chromatic aberrations while the third to fifth lenses are primarily responsible for correction of astigmatism and field curvatures. Since the second lens has negative refractive power with its convex surface facing the object side near the optical axis, spherical aberrations can be corrected adequately; and since the third lens has negative refractive power with its convex surface facing the object side near the optical axis and its power is small, off-axis aberrations (coma aberrations and field curvatures in particular) are corrected adequately while least affecting the power of the whole system. Also, since the aperture stop is located on the object side of the first lens, control of CRA (Chief Ray Angle) is easy. In other words, for an image sensor which must be telecentric, the light ray incidence angle can be easily controlled and the required light intensity is obtained in a peripheral area where the light intensity tends to be low. By balancing the lens shape and lens refractive power optimally, a compact high-performance imaging lens unit is obtained.

Preferably in the imaging lens unit, the third lens has aspheric surfaces whose power changes from negative to positive in a remoter area from the optical axis or peripheral area and a conditional expression (1) given below is satisfied wherein f denotes the focal length of the whole lens system and f3 denotes the focal length of the third lens:

$$-0.05 < f/f3 < 0.0 \quad (1)$$

The conditional expression (1) defines the power of the third lens and represents a condition required to assure miniaturization and correct coma aberrations and field curvatures adequately. If the ratio in the conditional expression (1) is above the upper limit "0.0", it is advantageous in terms of miniaturization but undesirably Petzval sum becomes positive and the image plane curves towards the object side. On the other hand, if it is below the lower limit "−0.05", the negative power of the third lens is too large, which is disadvantageous in terms of miniaturization and makes it difficult for the focal length of the whole system to fall within a desired range.

Preferably, conditional expressions (2) and (3) given below are satisfied wherein r5 denotes curvature radius of the object side surface of the third lens and r6 denotes curvature radius of the image side surface of the third lens:

$$0.9 < r5/r6 < 1.2 \quad (2)$$

$$1.2 < r5/f \quad (3)$$

The conditional expression (2) represents a condition required to define the shape of the third lens. In the present invention, the distance between the second and third lenses as well as the distance between the third and fourth lenses are minimized for miniaturization. Specifically, the basic curvature radius ratio of the object side surface of the third lens to its image side surface is set to around 1.0. Furthermore, the thickness difference between the center and peripheral area of the lens is decreased and variation in the aspheric sag amount of the object side surface and image side surface is minimized. If the ratio in the conditional expression (2) is above the upper limit "1.2" or below the lower limit "0.9", undesirably the thickness unevenness increases and the cubic volume occupied by the third lens increases.

If the ratio in the conditional expression (3) is below the lower limit "1.2", the amount of sag of this surface tends to increase and the cubic volume occupied by the third lens increases, making it difficult to achieve miniaturization.

Preferably, a conditional expression (4) given below is satisfied wherein f5 denotes the focal length of the fifth lens and f denotes the focal length of the whole lens system:

$$-0.8 < f5/f < -0.3 \tag{4}$$

The conditional expression (4) represents a condition required to shorten the optical total length while keeping good optical performance. Since the negative power of the fifth lens is relatively large, a so-called telephoto capability is obtained, contributing to miniaturization. If the ratio in the conditional expression (4) is above the upper limit "−0.3", the negative power of the fifth lens is too large (though it is advantageous in terms of reduction in total length) and the sensitivity to manufacturing errors becomes higher, which is disadvantageous in terms of stability in mass production. On the other hand, if the ratio is below the lower limit "−0.8", the negative power of the fifth lens is too small and it is difficult to shorten the total length.

Furthermore, preferably a conditional expression (5) given below is satisfied wherein r9 denotes the curvature radius of the object side surface of the fifth lens and r10 denotes curvature radius of the image side surface of the fifth lens:

$$5.0 < r9/r10 < 10.0 \tag{5}$$

The conditional expression (5) represents a condition for the fifth lens to correct spherical aberrations adequately, shorten the total length and reduce the sensitivity to manufacturing errors. The object side surface of the fifth lens is convex and its image side surface is concave, and the lens shape is determined by bending so as to minimize the influence of the fifth lens on spherical aberrations. If the ratio in the conditional expression (5) is above the upper limit "10.0", the power of the image side surface of the fifth lens is too strong and aberration which occurs on the surface increases (the absolute value of aberration coefficient increases), thus undesirably the sensitivity to manufacturing errors is high. On the other hand, if it is below the lower limit "5.0", the negative power of the fifth lens is weak and the telephoto capability weakens, which is disadvantageous in terms of reduction in total length.

Preferably, a conditional expression (6) given below is satisfied wherein r9 denotes curvature radius of an object side surface of the fifth lens and r10 denotes curvature radius of an image side surface of the fifth lens:

$$-7.0 < r9/r10 < -2.0 \tag{6}$$

The conditional expression (6) represents a condition for the fifth lens to shorten the total length and minimize the increase in aberrations and the rise in the sensitivity to manufacturing errors. The fifth lens forms a biconcave lens near the optical axis and the power of its object side surface is weak so that the influence of the fifth lens on spherical aberrations is minimized. In addition, more miniaturization can be achieved than when the object side surface is convex and the image side surface is concave. If the ratio in the conditional expression (6) is above the upper limit "−2.0", the curvature radius of the object side surface of the fifth lens is too small and undesirably the amount of high-order aberration on this surface increases, correction of aberrations becomes more difficult and the sensitivity of the surface to manufacturing errors becomes higher. On the other hand, if it is below the lower limit "−7.0", the curvature radius of the image side surface of the fifth lens becomes too small and undesirably the sensitivity of the surface to manufacturing errors becomes higher.

Preferably a conditional expression (7) given below is satisfied wherein f12 denotes composite focal length of the first lens and the second lens and f345 denotes composite focal length of the third lens, the fourth lens, and the fifth lens:

$$0.1 < f12/f345 < 0.5 \tag{7}$$

The conditional expression (7) represents a condition required to shorten the total length while maintaining the telephoto capability and correct aberrations adequately. When the composite power of the first and second lenses is stronger than the composite power of the third to fifth lenses, the telephoto capability (the object side of the positive lens, the image side of the negative lens) can be increased, contributing to reduction in total length. If the ratio in the conditional expression (7) is above the upper limit "0.5", the composite power of the first and second lenses is too weak and it is difficult to shorten the total length. On the other hand, if it is below the lower limit "0.1", the composite power of the first and second lenses is too strong and it is difficult to control the chief ray angle.

Preferably, a conditional expression (8) given below is satisfied wherein EPD denotes the diameter of the aperture stop and f denotes the focal length of the whole lens system:

$$2.0 < f/EPD < 2.8 \tag{8}$$

The conditional expression (8) represents a condition required to achieve the miniaturization of the imaging lens unit and make the F-number smaller. If the ratio is above the upper limit "2.8", the aperture diameter with respect to the focal length of the whole lens system is smaller and the brightness for the image sensor is insufficient though it is advantageous in terms of miniaturization. On the other hand, if it is below the lower limit "2.0", the aperture diameter with respect to the focal length of the whole lens system is large and the F-number is smaller, and it is difficult to achieve miniaturization though the imaging lens unit provides sufficient brightness.

It is desirable that all the constituent lenses be made of a plastic material. If all the constituent lenses are made of a plastic material, the imaging lens unit can be mass-produced and its cost can be reduced. In the present invention, chromatic aberrations are mainly corrected by the second lens and the second lens is made of a material with a small Abbe number such as polycarbonate and the first, third, fourth, and fifth lenses are all made of a cycloolefin polymer plastic material. The manufacturing process is simplified by using the same plastic material as much as possible for the plastic lenses which constitute the imaging lens unit.

DETAILED DESCRIPTION OF THE PREFERRED EMBODIMENTS

Next, the exemplary embodiments of the present invention will be described in detail referring to the accompanying drawings.

Embodiment 1

Figure 1:
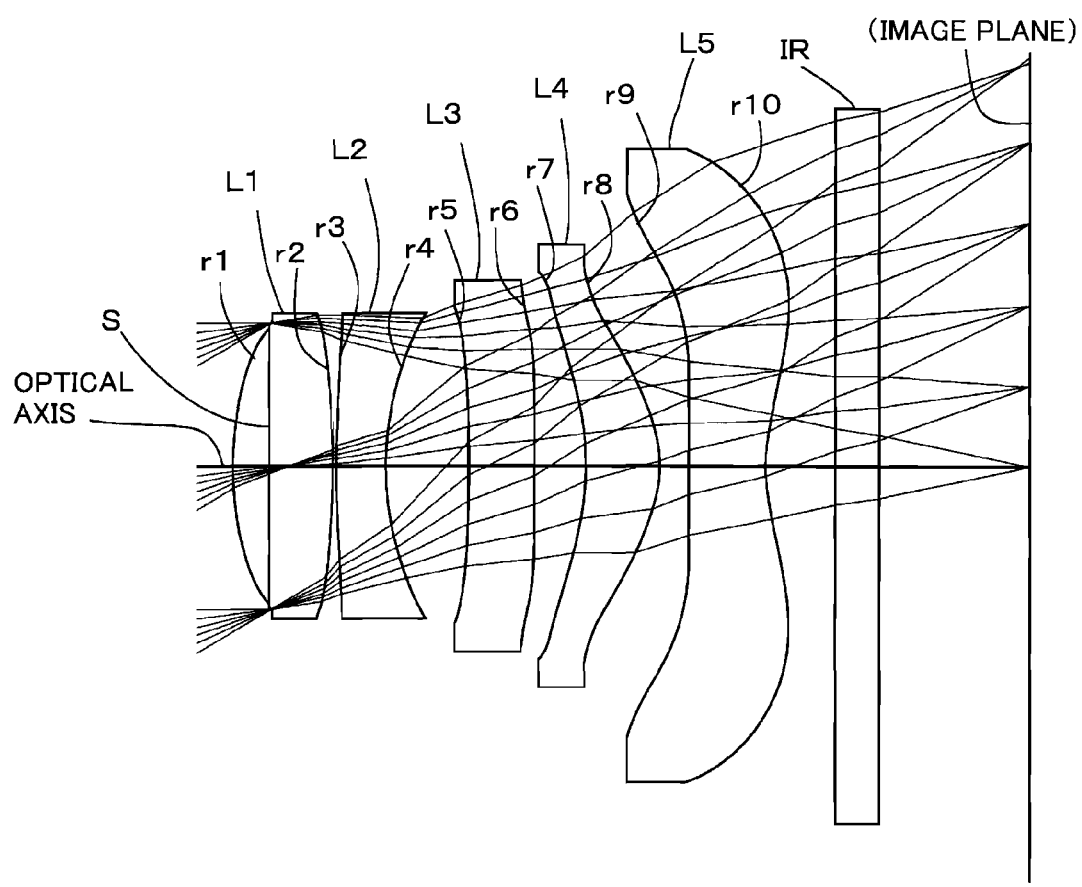
FIG. 1 is a sectional view of an imaging lens unit according to Example 1 of the present invention.
Figure 3:
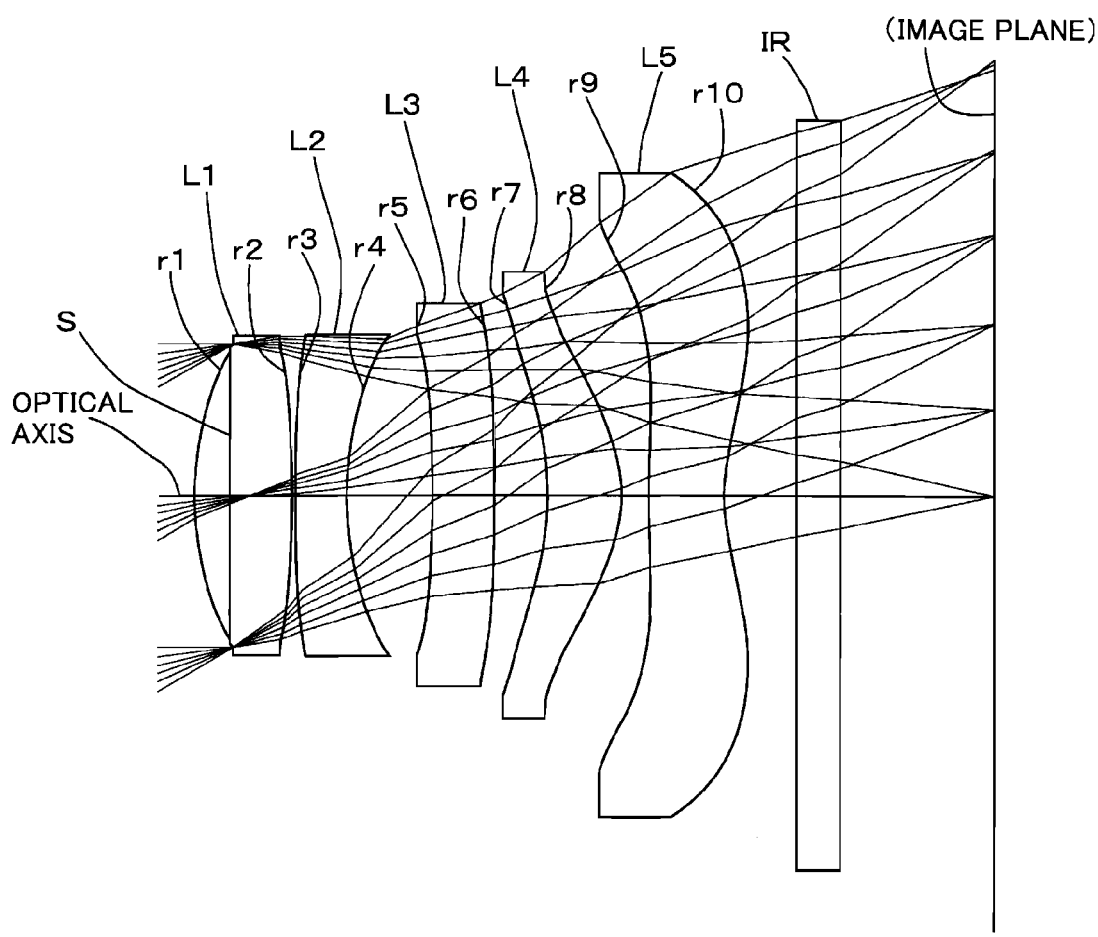
FIG. 3 is a sectional view of an imaging lens unit according to Example 2.

FIGS. 1 and 3 are sectional views of lenses according to Examples 1 and 2 of the first embodiment of the present invention. The basic lens structure is identical between the examples, so the structure of the imaging lens unit according to the first embodiment is explained below referring to the sectional view of the lens unit in Example 1.

As shown in FIG. 1, in the imaging lens unit according to the first embodiment, the constituent lenses are arranged from the object side to the image side in the following order: an aperture stop S, a first lens L1, second lens L2, a third lens L3, a fourth lens L4, and a fifth lens L5. A cover glass IR is placed between the fifth lens L5 and image plane. This cover glass is omissible. The first lens L1 is a biconvex lens with one convex surface facing the object side and the other facing the image side; the second lens L2 is a lens with negative refractive power lens having a convex surface facing the object side near the optical axis; the third lens L3 is a lens with negative refractive power having a convex surface facing the object side near the optical axis; the fourth lens L4 is a meniscus lens with positive refractive power having a convex surface facing the image side near the optical axis; and the fifth lens L5 is a meniscus lens with negative refractive power having a concave surface facing the image side near the optical axis.

Though the third lens L3 has slightly negative power in its center, it has aspheric surfaces in which the power gradually turns positive in a remoter area from the optical axis or peripheral area.

The imaging lens unit according to the first embodiment is designed to satisfy conditional expressions (1) to (5), (7) and (8) given below:

$$-0.05 < f/f3 < 0.0 \quad (1)$$

$$0.9 < r5/r6 < 1.2 \quad (2)$$

$$1.2 < r5/f \quad (3)$$

$$-0.8 < f5/f < -0.3 \quad (4)$$

$$5.0 < r9/r10 < 10.0 \quad (5)$$

$$0.1 < f12/f345 < 0.5 \quad (7)$$

$$2.0 < f/EPD < 2.8 \quad (8)$$

wherein
f: Focal length of the whole lens system
f3: Focal length of the third lens L3
r5: Curvature radius of the object side surface of the third lens L3
r6: Curvature radius of the image side surface of the third lens
f5: Focal length of the fifth lens L5
r9: Curvature radius of the object side surface of the fifth lens
r10: Curvature radius of the image side surface of the fifth lens
f12: Composite focal length of the first lens L1 and second lens L2
f345: Composite focal length of the third lens L3, fourth lens L4 and fifth lens L5
EPD: Diameter of the aperture stop In the present embodiment, some lens surfaces are aspheric as needed. The aspheric shapes of these lens surfaces are expressed by the equation given below wherein Z denotes the optical axis, H denotes the height perpendicular to the optical axis, k denotes conic coefficient, and $A_4$, $A_6$, $A_8$, and $A_{10}$ denote aspheric coefficients. Also in the imaging lens unit according to the second embodiment which will be described later, the surfaces of some lenses are aspheric as needed and the aspheric shapes of these lenses are expressed by the equation below in the same way as in the first embodiment.

$$Z = (h^2/r)/[1 + \{1-(1+K)(h^2/r^2)\}^{1/2}] + A_4 h^4 + A_6 h^6 + A_8 h^8 + \ldots \quad \text{[Equation 1]}$$

Next, examples of the imaging lens unit according to the first embodiment are given. In each example, f denotes the focal length of the whole lens system, Fno denotes F-number and ω denotes half angle of view. Also, i denotes surface number as counted from the object side, R denotes curvature radius, d denotes the distance between lens surfaces (interval between surfaces) on the optical axis, Nd denotes the refractive index with respect to line d, and νd denotes Abbe number with respect to line d. Aspheric surfaces are indicated by an asterisk (*) following surface number i. The same symbols are used for the imaging lens unit according to the second embodiment which will be described later.

EXAMPLE 1

Table 1 shows the basic lens data of the imaging lens unit in Example 1.

TABLE 1

| f = 4.8341 | Fno = 2.405 | ω = 30.463° | | |
|---|---|---|---|---|
| i | R | d | Nd | νd |
| S (aperture stop) | ∞ | −0.245 | | |
| 1* | 1.920 | 0.698 | 1.535 | 56.2 |
| 2* | −4.989 | 0.023 | | |
| 3* | 11.316 | 0.348 | 1.614 | 25.6 |

TABLE 1-continued

| i | R | d | Nd | vd |
|---|---|---|---|---|
| 4* | 1.950 | 0.582 | | |
| 5* | 56.979 | 0.468 | 1.535 | 56.2 |
| 6* | 51.798 | 0.36 | | |
| 7* | −1.984 | 0.518 | 1.535 | 56.2 |
| 8* | −0.997 | 0.2045 | | |
| 9* | 12.783 | 0.5428 | 1.535 | 56.2 |
| 10* | 1.466 | 0.5 | | |
| 11 | ∞ | 0.3 | 1.517 | 64.2 |
| 12 | ∞ | 1.047 | | |
| IMA | ∞ | | | |

| i | k | $A_4$ | $A_6$ | $A_8$ | $A_{10}$ | $A_{12}$ | $A_{14}$ |
|---|---|---|---|---|---|---|---|
| 1* | −8.984E−01 | 1.386E−02 | −4.452E−03 | −3.635E−03 | 6.925E−04 | −8.637E−04 | −5.237E−03 |
| 2* | −9.222E+01 | −2.778E−03 | 1.138E−02 | −2.995E−02 | −1.127E−02 | 4.241E−03 | 2.486E−03 |
| 3* | 2.370E+01 | −2.865E−02 | 6.387E−02 | −5.835E−02 | 4.217E−03 | −2.627E−03 | 1.038E−02 |
| 4* | −3.288E−01 | −1.219E−01 | 1.557E−01 | −9.759E−02 | 3.109E−02 | −6.668E−03 | 6.555E−03 |
| 5* | 0.000E+00 | −1.085E−01 | 2.088E−03 | 2.471E−02 | | | |
| 6* | 0.000E+00 | −8.922E−02 | 5.635E−02 | −4.296E−02 | 1.935E−02 | −2.144E−03 | |
| 7* | 8.968E−01 | 4.373E−02 | 8.519E−02 | −5.000E−02 | 1.419E−02 | −7.279E−04 | |
| 8* | −2.541E+00 | −1.130E−01 | −9.215E−04 | 2.091E−02 | −3.309E−03 | −6.569E−04 | |
| 9* | 2.998E+01 | −7.461E−02 | −5.870E−03 | 3.201E−03 | 5.679E−04 | −2.374E−05 | −2.461E−05 |
| 10* | −9.099E+00 | −7.716E−02 | 2.012E−02 | −5.983E−03 | 1.079E−03 | −9.016E−05 | | f3 = −1095.56
f5 = −3.1373
f12 = 5.72
f345 = 33.2885
EPD = 2.01

The values in the conditional expressions in Example 1 are given below:
f/f3=−0.0044
r5/r6=1.100
r5/f=11.787
f5/f=−0.649
r9/r10=8.719
f12/f345=0.172
f/EPD=2.405

As apparent from the above, the imaging lens unit in Example 1 satisfies the conditional expressions (1) to (5), (7), and (8).

Figure 2:
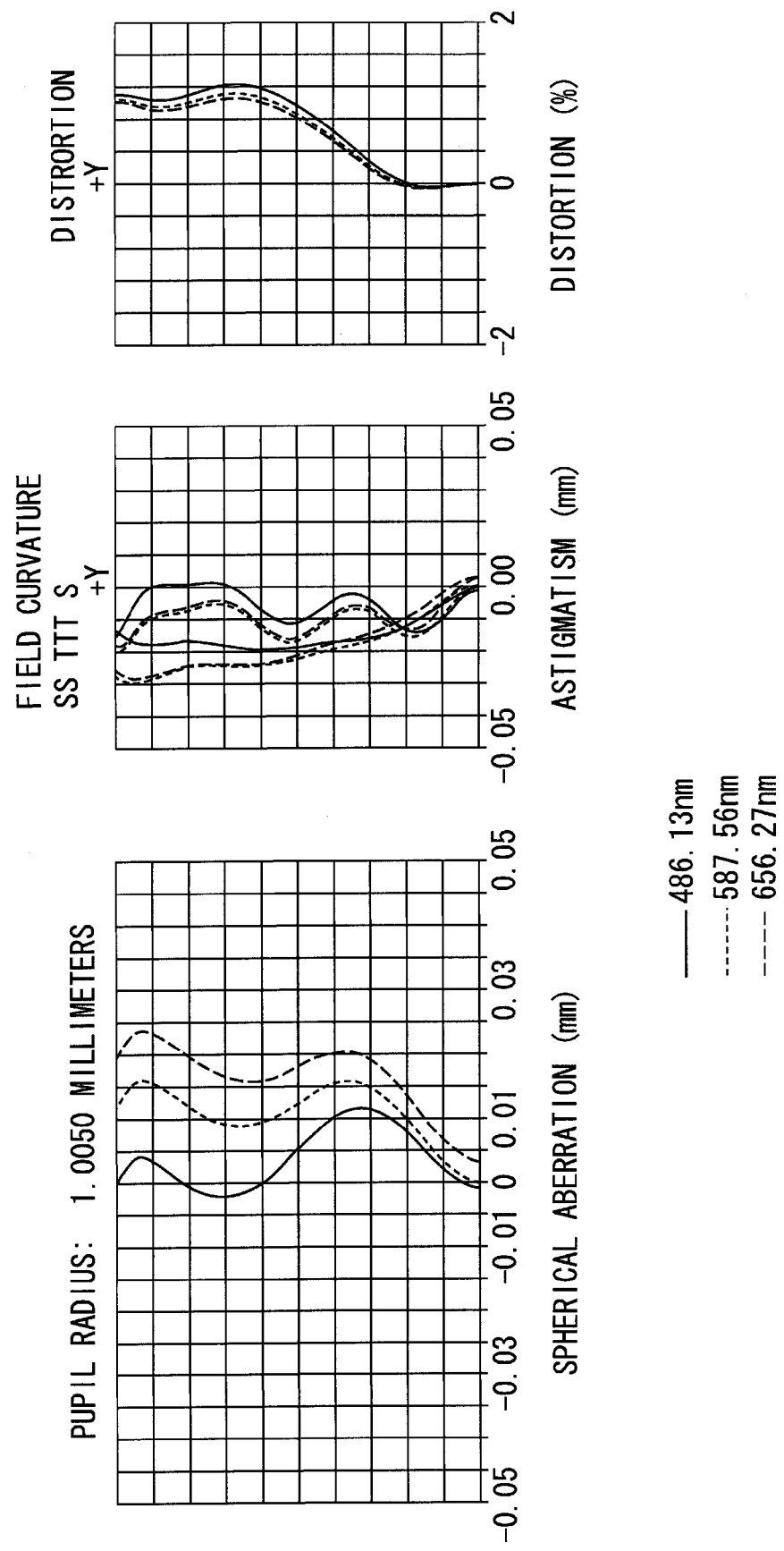
FIG. 2 shows various aberrations graphically according to Example 1.

FIG. 2 includes graphs which show the spherical aberration (mm), astigmatism (field curvature) (mm), and distortion (%) of the imaging lens unit in Example 1. These graphs show the amounts of aberration corresponding to wavelengths 587.56 nm, 656.27 nm, and 486.13 nm. The astigmatism graph shows the amounts of aberration on sagittal image plane S and the amounts of aberration on tangential image plane T (the same as in FIGS. 4, 6, 8, 10, and 12).

As shown in FIG. 2, various aberrations can be corrected adequately with the imaging lens unit in Example 1. In addition, the equivalent air distance from the object side surface of the first lens L1 to the image plane is as short as 5.49 mm, which means that the imaging lens unit size is reduced in a preferable manner.

EXAMPLE 2

Table 2 shows the basic lens data of the imaging lens unit in Example 2.

TABLE 2

| | f = 4.82595 | Fno = 2.400 | ω = 30.484° | |
|---|---|---|---|---|
| i | R | d | Nd | vd |
| S (aperture stop) | ∞ | −0.25 | | |
| 1* | 1.920 | 0.679 | 1.535 | 56.2 |
| 2* | −5.100 | 0.023 | | |
| 3* | 9.065 | 0.3605 | 1.614 | 25.6 |
| 4* | 1.853 | 0.592 | | |
| 5* | 51.000 | 0.439 | 1.535 | 56.2 |
| 6* | 50.000 | 0.375 | | |
| 7* | −1.915 | 0.518 | 1.535 | 56.2 |
| 8* | −0.988 | 0.191 | | |
| 9* | 9.679 | 0.5308 | 1.535 | 56.2 |
| 10* | 1.464 | 0.5 | | |
| 11 | ∞ | 0.3 | 1.517 | 64.2 |
| 12 | ∞ | 1.081 | | |
| IMA | ∞ | | | |

| i | k | $A_4$ | $A_6$ | $A_8$ | $A_{10}$ | $A_{12}$ | $A_{14}$ |
|---|---|---|---|---|---|---|---|
| 1* | 0.000E+00 | −1.841E−03 | −1.651E−02 | 1.820E−02 | −1.883E−02 | | |
| 2* | −8.187E+01 | 2.887E−03 | 4.435E−03 | −2.313E−02 | | | |
| 3* | 2.334E+00 | −3.108E−02 | 6.707E−02 | −5.101E−02 | 1.538E−02 | −5.459E−03 | 4.460E−03 |
| 4* | 0.000E+00 | −1.341E−01 | 1.587E−01 | −1.056E−01 | 4.540E−02 | −4.181E−03 | −8.490E−04 |
| 5* | 0.000E+00 | −1.226E−01 | 5.463E−03 | 2.911E−02 | | | |

TABLE 2-continued

| | f = 4.82595 | | Fno = 2.400 | ω = 30.484° | | |
|---|---|---|---|---|---|---|
| 6* | 0.000E+00 | −9.733E−02 | 3.206E−02 | 1.364E−03 | | |
| 7* | 8.240E−01 | 3.519E−02 | 9.267E−02 | −4.094E−02 | 8.895E−03 | |
| 8* | −2.462E+00 | −7.565E−03 | 3.357E−03 | 2.084E−02 | −5.920E−03 | |
| 9* | 1.627E+01 | −6.498E−02 | −7.256E−03 | 2.663E−03 | 5.157E−04 | −1.164E−05 −2.080E−05 |
| 10* | −9.192E+00 | −7.339E−02 | 1.842E−02 | −5.591E−03 | 1.022E−03 | −8.684E−05 | f3 = −5609.97
f5 = −3.2876
f12 = 5.782
f345 = 25.731
EPD = 2.01

The values in the conditional expressions in Example 2 are given below:
f/f3=−0.0009
r5/r6=1.020
r5/f=10.568
f5/f=−0.681
r9/r10=6.610
f12/f345=0.225
f/EPD=2.40

As apparent from the above, the imaging lens unit in Example 2 satisfies the conditional expressions (1) to (5), (7), and (8).

Figure 4:
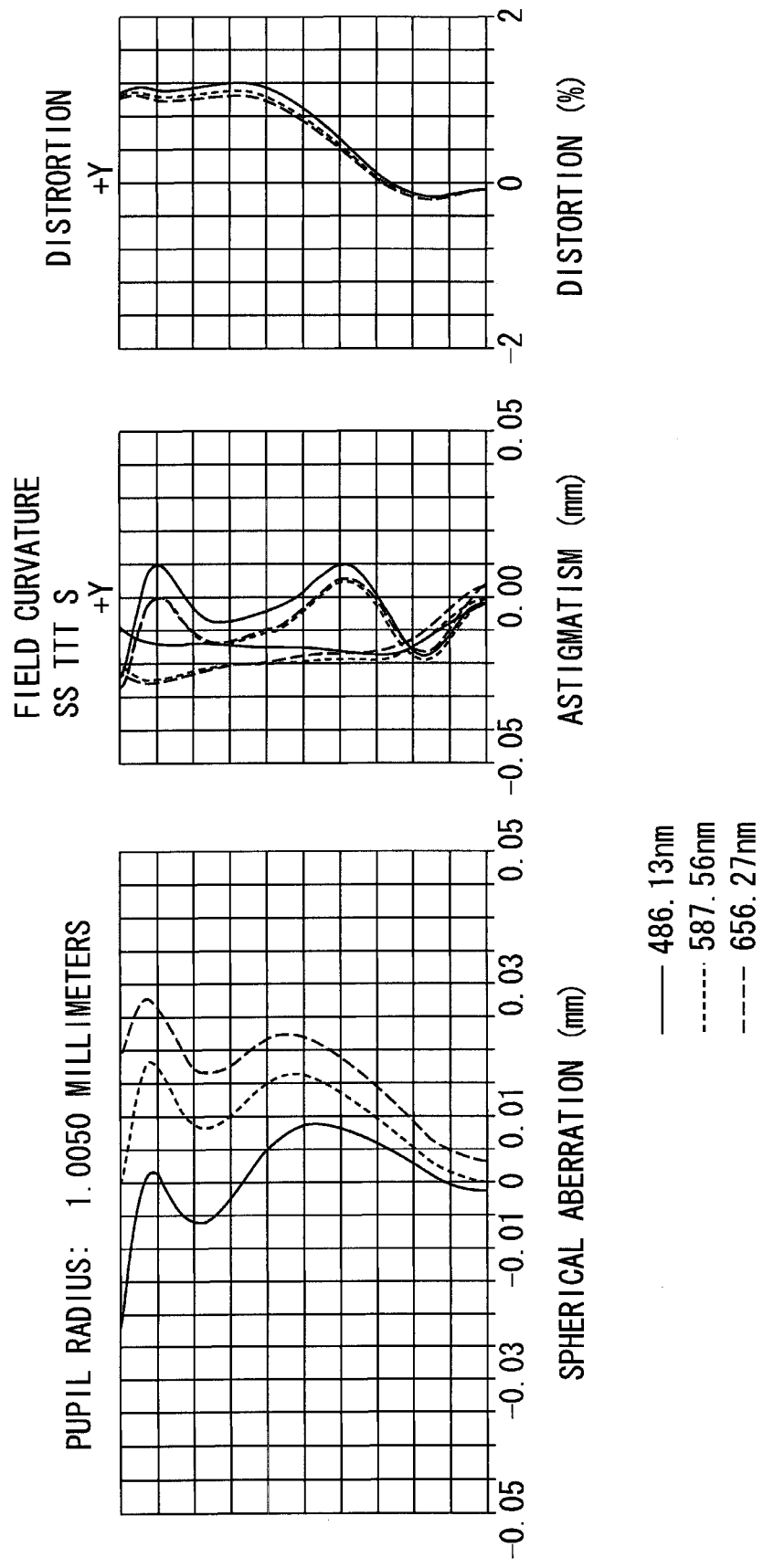
FIG. 4 shows various aberrations graphically according to Example 2.

FIG. 4 includes graphs which show the spherical aberration (mm), astigmatism (field curvature) (mm) and distortion (%) of the imaging lens unit in Example 2. As shown in FIG. 4, various aberrations can be corrected adequately with the imaging lens unit in Example 2. In addition, the equivalent air distance from the object side surface of the first lens L1 to the image plane is as short as 5.49 mm, which means that the imaging lens unit size is reduced in a preferable manner.

Embodiment 2

Next, the second embodiment of the present invention will be described in detail referring to the accompanying drawings.

FIGS. 5, 7, 9 and 11 are sectional views of lens units according to Examples 3 to 6 of the second embodiment of the present invention. The basic lens structure is identical among these examples, so the structure of the imaging lens unit according to the second embodiment is explained below referring to the sectional view of the lens unit in Example 3.

Figure 5:
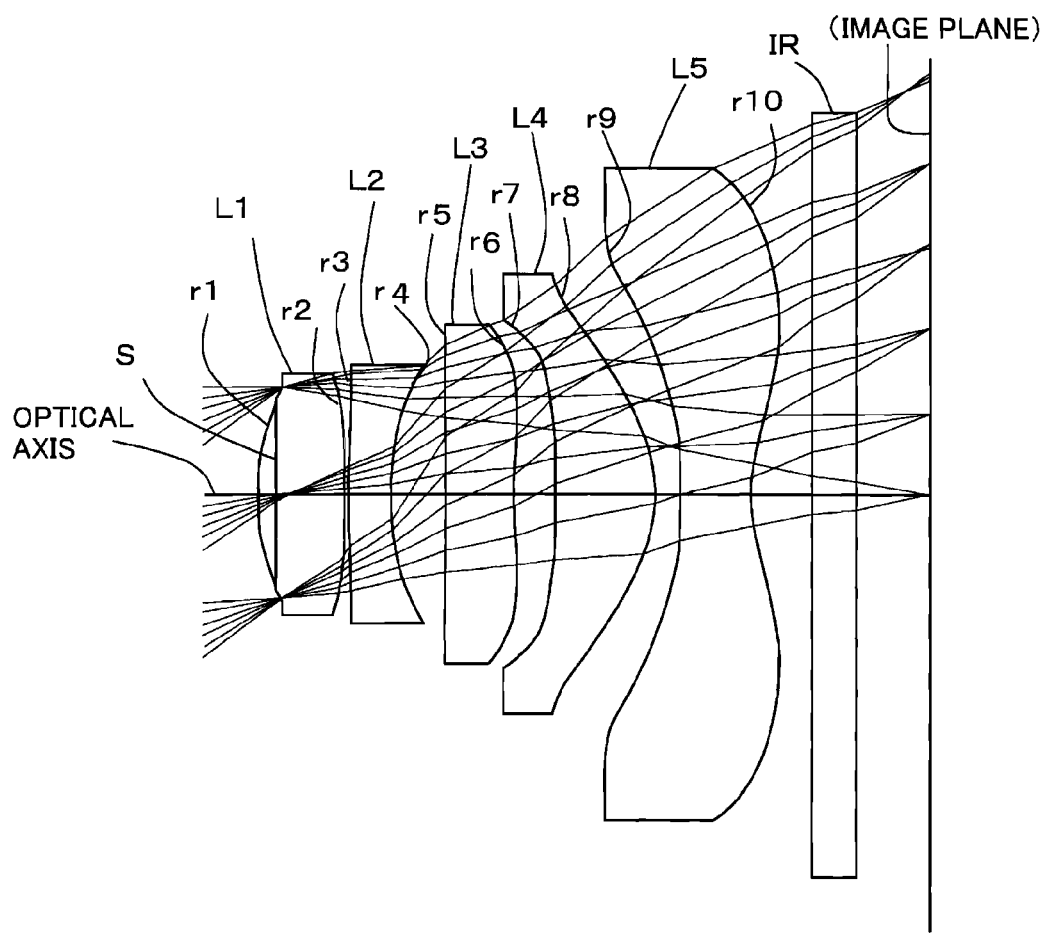
FIG. 5 is a sectional view of an imaging lens unit according to Example 3 of the invention.

As shown in FIG. 5, in the imaging lens unit according to the second embodiment, the constituent lenses are arranged from the object side to the image side in the following order: an aperture stop S, a first lens L1, a second lens L2, a third lens L3, a fourth lens L4, and a fifth lens L5. A cover glass IR is placed between the fifth lens L5 and image plane. This cover glass is omissible. The first lens L1 is a biconvex lens with one convex surface facing the object side and the other facing the image side; the second lens L2 is a lens with negative refractive power having a convex surface facing the object side near the optical axis; the third lens L3 is a lens with negative refractive power having a convex surface facing the object side near the optical axis; and the fourth lens L4 is a meniscus lens with positive refractive power having a convex surface facing the image side near the optical axis. These lenses are the same as in the first embodiment. The second embodiment is different from the first embodiment in that the fifth lens L5 is a biconcave lens with its concave surfaces facing the object side and image side near the optical axis.

As in the first embodiment, though the third lens L3 has a slightly negative power in its center, it has aspheric surfaces in which the power gradually turns positive in a remoter area from the optical axis or peripheral area.

The imaging lens unit according to the second embodiment is designed to satisfy conditional expressions (1) to (4) and (6) to (8) given below:

$$-0.05<f/f3<0.0 \qquad (1)$$

$$0.9<r5/r6<1.2 \qquad (2)$$

$$1.2<r5/f \qquad (3)$$

$$-0.8<f5/f<-0.3 \qquad (4)$$

$$-7.0<r9/r10<-2.0 \qquad (6)$$

$$0.1<f12/f345<0.5 \qquad (7)$$

$$2.0<f/EPD<2.8 \qquad (8)$$

wherein
f: Focal length of the whole lens system
f3: Focal length of the third lens L3
r5: Curvature radius of the object side surface of the third lens L3
r6: Curvature radius of the image side surface of the third lens
f5: Focal length of the fifth lens L5
r9: Focal length of the object side surface of the fifth lens
r10: Focal length of the image side surface of the fifth lens
f12: Composite focal length of the first lens L1 and second lens L2
f345: Composite focal length of the third lens L3, fourth lens L4 and fifth lens L5
EPD: Diameter of aperture stop

EXAMPLE 3

Table 3 shows the basic lens data of the imaging lens unit in Example 3.

TABLE 3

| | f = 3.7579 | Fno = 2.54 | ω = 37.32° | |
|---|---|---|---|---|
| i | R | d | Nd | vd |
| S (aperture stop) | ∞ | −0.12 | | |
| 1* | 1.694 | 0.605 | 1.535 | 56.2 |

TABLE 3-continued

| | | | | | |
|---|---|---|---|---|---|
| 2* | −5.188 | 0.025 | | | |
| 3* | 11.629 | 0.29 | 1.614 | 25.6 | |
| 4* | 1.857 | 0.38 | | | |
| 5* | 8.068 | 0.49 | 1.535 | 56.2 | |
| 6* | 7.620 | 0.28 | | | |
| 7* | −7.166 | 0.7 | 1.535 | 56.2 | |
| 8* | −0.908 | 0.17 | | | |
| 9* | −6.939 | 0.49 | 1.535 | 56.2 | |
| 10* | 1.049 | 0.43 | | | |
| 11 | ∞ | 0.3 | 1.517 | 64.2 | |
| 12 | ∞ | 0.501 | | | |
| IMA | ∞ | | | | |

| i | k | $A_4$ | $A_6$ | $A_8$ | $A_{10}$ | $A_{12}$ | $A_{14}$ |
|---|---|---|---|---|---|---|---|
| 1* | −1.549E+00 | 2.383E−02 | 4.477E−03 | −6.883E−02 | | | |
| 2* | 0.000E+00 | 1.060E−01 | −2.933E−01 | 1.094E−01 | | | |
| 3* | 0.000E+00 | 4.334E−02 | −8.738E−02 | −1.232E−01 | 1.590E−01 | | |
| 4* | −5.326E−01 | −7.034E−02 | 2.554E−01 | −3.344E−01 | 2.352E−01 | −5.973E−02 | |
| 5* | −1.875E+01 | −1.148E−01 | −3.624E−03 | 1.284E−01 | −8.943E−02 | 2.052E−02 | |
| 6* | 0.000E+00 | −7.732E−02 | −1.080E−01 | 1.003E−01 | −5.631E−02 | 1.150E−02 | |
| 7* | 0.000E+00 | 3.435E−02 | −7.870E−02 | −7.350E−02 | 8.048E−02 | −3.213E−02 | |
| 8* | −4.072E+00 | −1.299E−01 | 1.600E−01 | −1.711E−01 | 8.840E−02 | −1.531E−02 | |
| 9* | 0.000E+00 | −1.504E−01 | 5.571E−02 | −5.591E−03 | | | |
| 10* | −7.576E+00 | −1.208E−01 | 6.192E−02 | −2.288E−02 | 4.966E−03 | −5.853E−04 | 2.871E−05 | f3 = −413.22
f5 = −1.6612
f12 = 5.2075
f345 = 19.078
EPD = 1.48

The values in the conditional expressions in Example 3 are given below:
f/f3=−0.0091
r5/r6=1.059
r5/f=2.147
f5/f=−0.442
r9/r10=−6.617
f12/f345=0.273
f/EPD=2.54

As apparent from the above, the imaging lens unit in Example 3 satisfies the conditional expressions (1) to (4) and (6) to (8).

Figure 6:
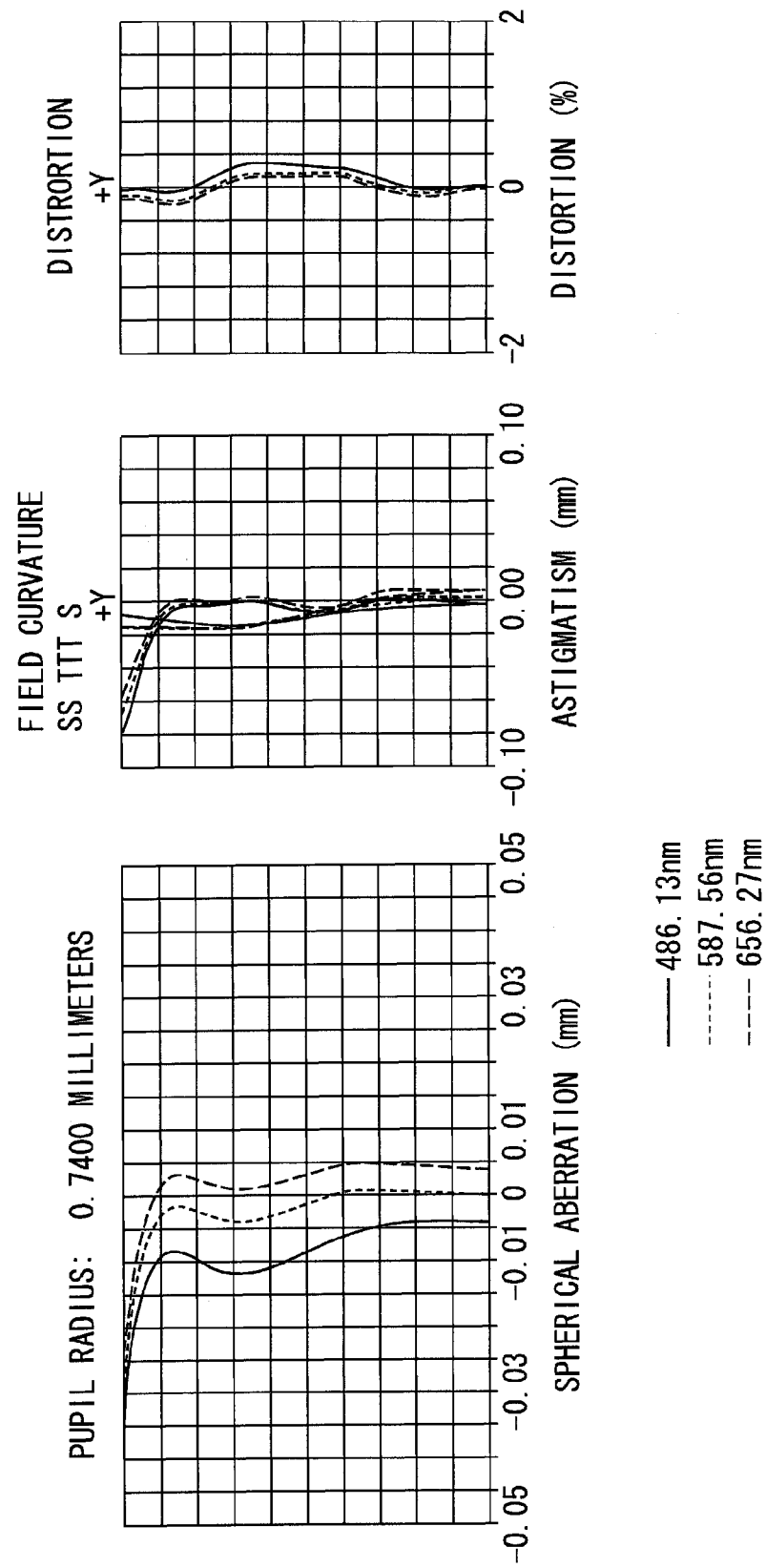
FIG. 6 shows various aberrations graphically according to Example 3.
Figure 7:
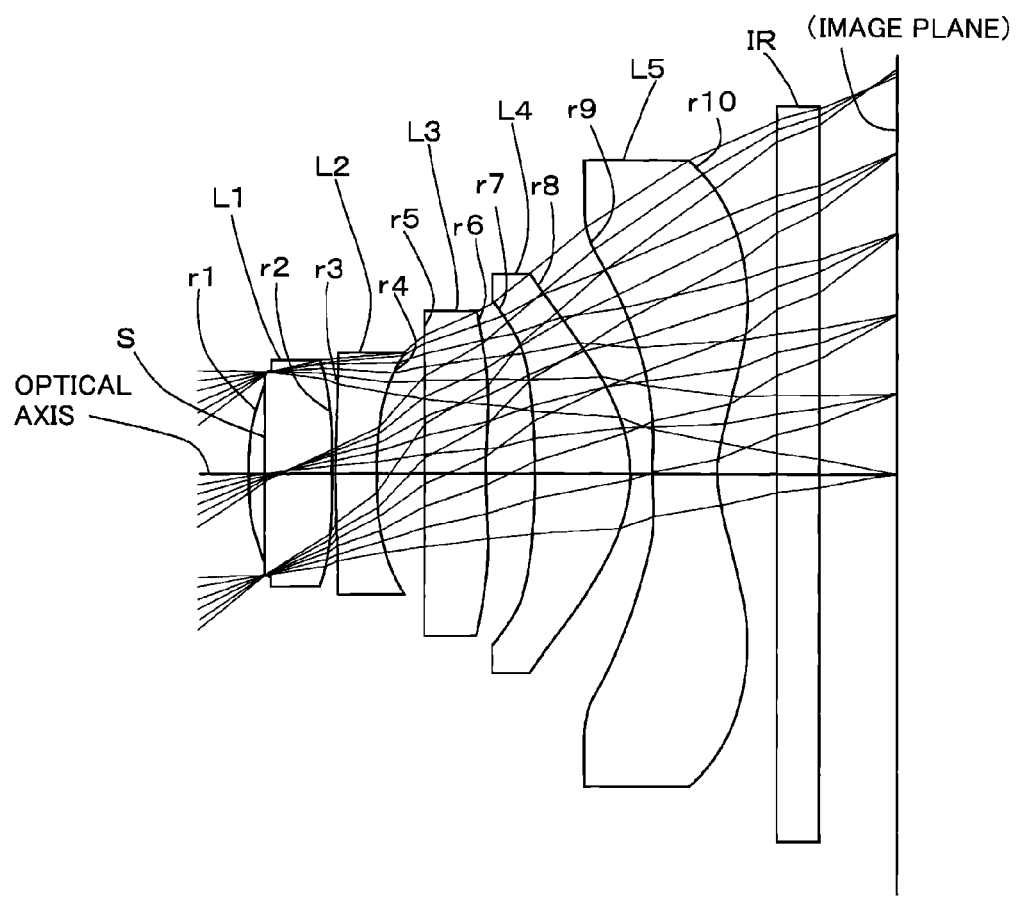
FIG. 7 is a sectional view of an imaging lens unit according to Example 4 of the invention.

FIG. 6 includes graphs which show the spherical aberration (mm), astigmatism (field curvature) (mm), and distortion (%) of the imaging lens unit in Example 3. As shown in FIG. 6, various aberrations can be corrected adequately with the imaging lens unit in Example 3. In addition, the equivalent air distance from the object side surface of the first lens L1 to the image plane is as short as 4.56 mm, which means that the imaging lens unit size is reduced in a preferable manner.

EXAMPLE 4

Table 4 shows the basic lens data of the imaging lens unit in Example 4.

TABLE 4

| f = 3.812 | Fno = 2.647 | ω = 37.053° | | |
|---|---|---|---|---|
| i | R | d | Nd | vd |
| S (aperture stop) | ∞ | −0.12 | | |
| 1* | 1.713 | 0.605 | 1.535 | 56.2 |
| 2* | −5.188 | 0.025 | | |
| 3* | 11.629 | 0.29 | 1.614 | 25.6 |
| 4* | 1.868 | 0.35 | | |
| 5* | 8.068 | 0.45 | 1.535 | 56.2 |
| 6* | 7.620 | 0.35 | | |
| 7* | −7.166 | 0.7 | 1.535 | 56.2 |
| 8* | −0.902 | 0.17 | | |
| 9* | −6.939 | 0.47 | 1.535 | 56.2 |
| 10* | 1.049 | 0.43 | | |
| 11 | ∞ | 0.3 | 1.517 | 64.2 |
| 12 | ∞ | 0.553 | | |
| IMA | ∞ | | | |

| i | k | $A_4$ | $A_6$ | $A_8$ | $A_{10}$ | $A_{12}$ | $A_{14}$ |
|---|---|---|---|---|---|---|---|
| 1* | −2.112E+00 | 3.636E−02 | −1.523E−02 | −4.869E−02 | | | |
| 2* | 0.000E+00 | 6.175E−02 | −1.849E−01 | 5.116E−02 | | | |
| 3* | 0.000E+00 | −7.981E−03 | 7.358E−02 | −2.527E−01 | 1.908E−01 | | |
| 4* | −5.326E−01 | −9.710E−02 | 3.390E−01 | −4.272E−01 | 2.613E−01 | −5.235E−02 | |
| 5* | −8.897E−01 | −1.475E−01 | 5.695E−02 | 1.107E−01 | −8.720E−02 | 8.678E−03 | |
| 6* | 0.000E+00 | −1.327E−01 | 7.183E−03 | 2.671E−02 | −1.900E−03 | −2.762E−03 | |
| 7* | 0.000E+00 | −3.088E−02 | −1.489E−02 | −7.802E−02 | 7.150E−02 | −2.059E−02 | |

TABLE 4-continued

| 8* | −4.031E+00 | −1.308E−01 | 1.423E−01 | −1.448E−01 | 7.419E−02 | −1.303E−02 | |
|---|---|---|---|---|---|---|---|
| 9* | 0.000E+00 | −1.129E−01 | 3.835E−02 | −3.609E−03 | | | |
| 10* | −7.506E+00 | −1.076E−01 | 5.139E−02 | −1.854E−02 | 3.991E−03 | −4.714E−04 | 2.306E−05 | f3 = −393.382
f5 = −1.66267
f12 = 5.27745
f345 = 18.4219
EPD = 1.44

The values in the conditional expressions in Example 4 are given below:
f/f3=−0.0097
r5/r6=1.059
r5/f=2.121
f5/f=−0.436
r9/r10=−6.617
f12/f345=0.286
f/EPD−2.65

As apparent from the above, the imaging lens unit in Example 4 satisfies the conditional expressions (1) to (4) and (6) to (8).

Figure 8:
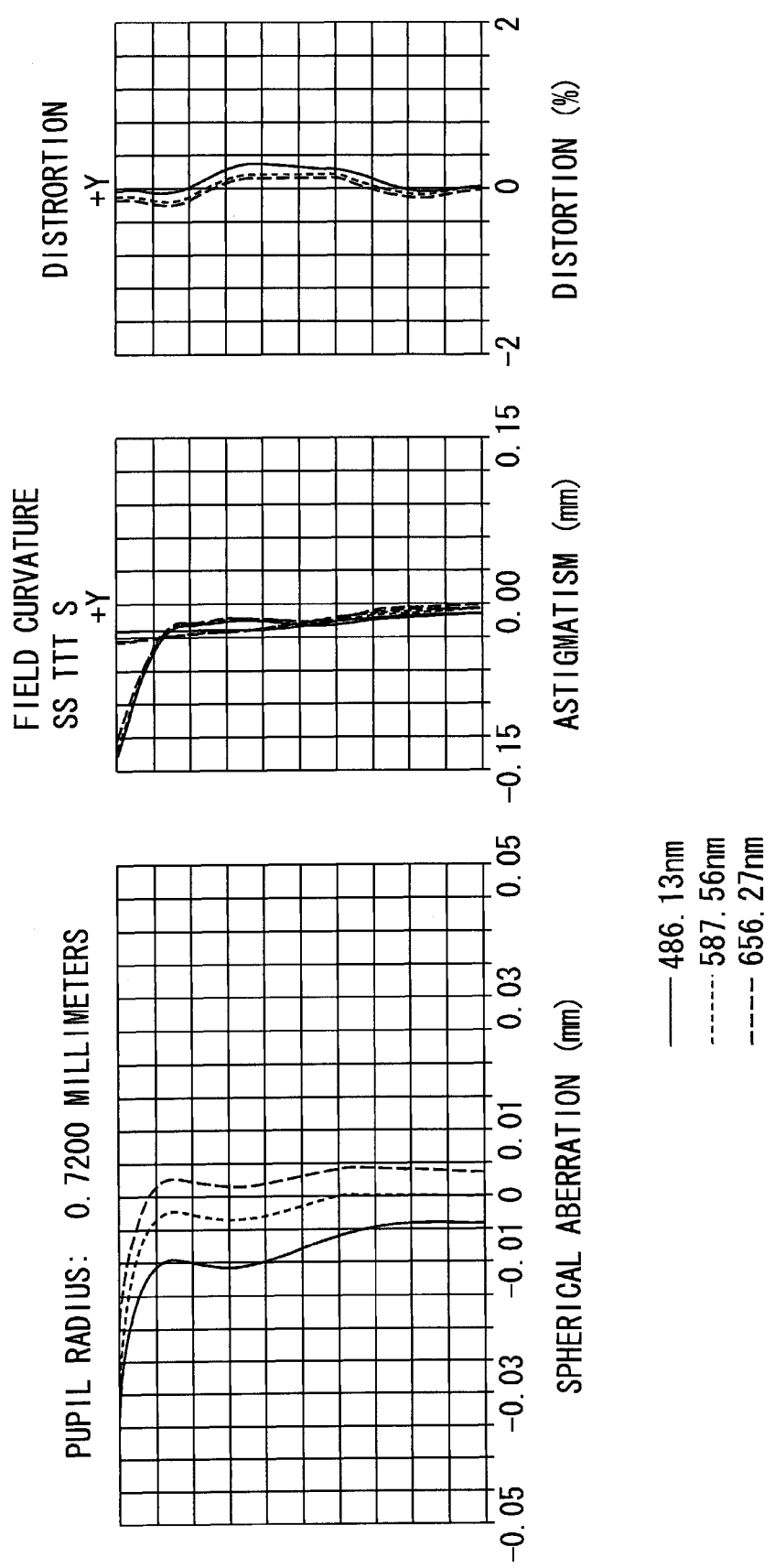
FIG. 8 shows various aberrations graphically according to Example 4.
Figure 9:
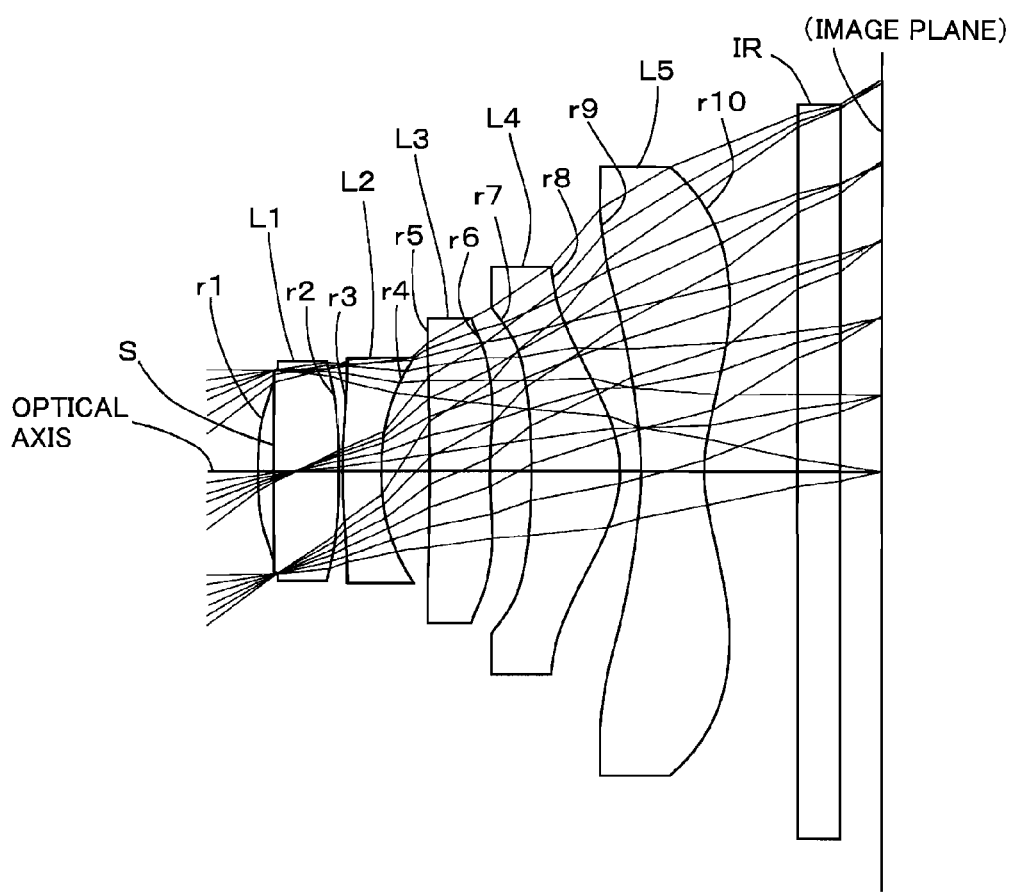
FIG. 9 is a sectional view of an imaging lens unit according to Example 5.

FIG. 8 includes graphs which show the spherical aberration (mm), astigmatism (field curvature) (mm) and distortion (%) of the imaging lens unit in Example 4. As shown in FIG. 8, various aberrations can be corrected adequately with the imaging lens unit in Example 4. In addition, the equivalent air distance from the object side surface of the first lens L1 to the image plane is as short as 4.59 mm, which means that the imaging lens unit size is reduced in a preferable manner.

EXAMPLE 5

Table 5 shows the basic lens data of the imaging lens unit in Example 5.

TABLE 5

| f = 3.8096 | Fno = 2.5397 | ω = 37.0904 | | |
|---|---|---|---|---|
| i | R | d | Nd | vd |
| S (aperture stop) | ∞ | −0.12 | | |
| 1* | 1.779 | 0.605 | 1.535 | 56.2 |
| 2* | −4.255 | 0.025 | | |
| 3* | 5.162 | 0.29 | 1.614 | 25.6 |
| 4* | 1.466 | 0.36 | | |
| 5* | 8.068 | 0.46 | 1.535 | 56.2 |
| 6* | 7.620 | 0.3 | | |
| 7* | −7.260 | 0.66 | 1.535 | 56.2 |
| 8* | −0.849 | 0.16 | | |
| 9* | −3.179 | 0.47 | 1.535 | 56.2 |
| 10* | 1.242 | 0.7 | | |
| 11 | ∞ | 0.3 | 1.517 | 64.2 |
| 12 | ∞ | 0.324 | | |
| IMA | ∞ | | | |

| i | k | $A_4$ | $A_6$ | $A_8$ | $A_{10}$ | $A_{12}$ | $A_{14}$ |
|---|---|---|---|---|---|---|---|
| 1* | −2.253E+00 | 2.267E−02 | −3.731E−03 | −8.286E−02 | | | |
| 2* | 0.000E+00 | 8.325E−02 | −2.496E−01 | 9.927E−02 | | | |
| 3* | 0.000E+00 | −3.343E−02 | 6.164E−02 | −2.495E−01 | 2.337E−01 | | |
| 4* | −3.902E+00 | −3.845E−02 | 3.828E−01 | −6.470E−01 | 5.490E−01 | −1.653E−01 | |
| 5* | 0.000E+00 | −1.472E−01 | 5.881E−02 | 4.979E−02 | −4.810E−02 | 1.320E−02 | |
| 6* | 0.000E+00 | −1.657E−01 | 4.461E−02 | −9.158E−02 | 4.907E−02 | 4.102E−03 | |
| 7* | 0.000E+00 | −1.068E−01 | 1.447E−01 | −1.734E−01 | 4.856E−02 | 5.291E−03 | |
| 8* | −3.631E+00 | −1.207E−01 | 1.977E−01 | −1.008E−01 | 2.428E−02 | −2.405E−03 | |
| 9* | 0.000E+00 | 2.545E−02 | −1.127E−04 | | | | |
| 10* | −1.011E+01 | −8.615E−02 | 4.142E−02 | −1.612E−02 | 3.700E−03 | −4.699E−04 | 2.528E−05 | f3 = −399.233
f5 = −1.61057
f12 = 5.30203
f345 = 15.3728
EPD = 1.5

The values in the conditional expressions in Example 5 are given below:
f/f3=−0.0095
r5/r6=1.059
r5/f=2.123
f5/f=−0.423
r9/r10=−2.56
f12/f345=0.345
f/EPD–2.54

As apparent from the above, the imaging lens unit in Example 5 satisfies the conditional expressions (1) to (4) and (6) to (8).

Figure 10:
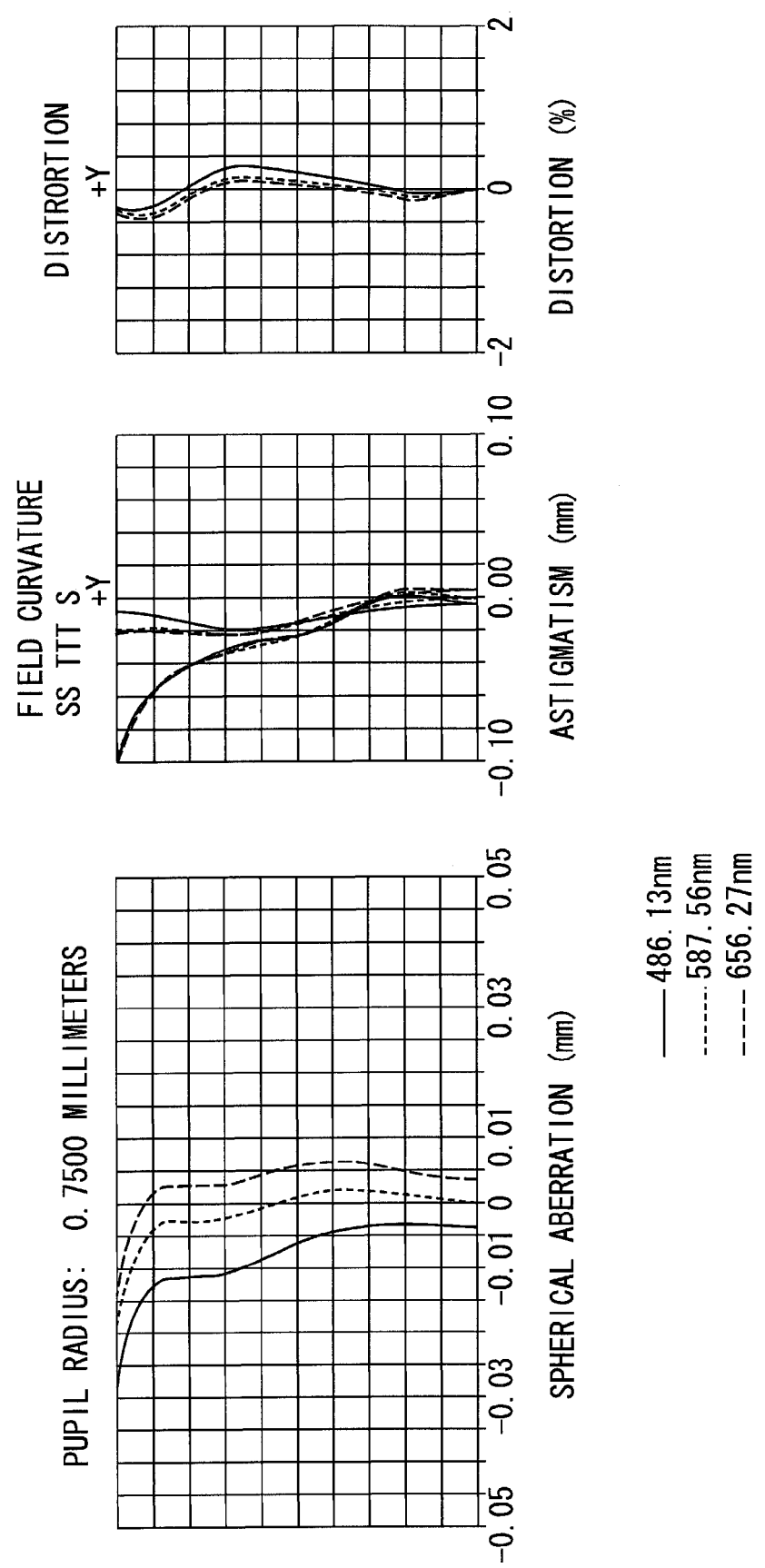
FIG. 10 shows various aberrations graphically according to Example 5.
Figure 11:
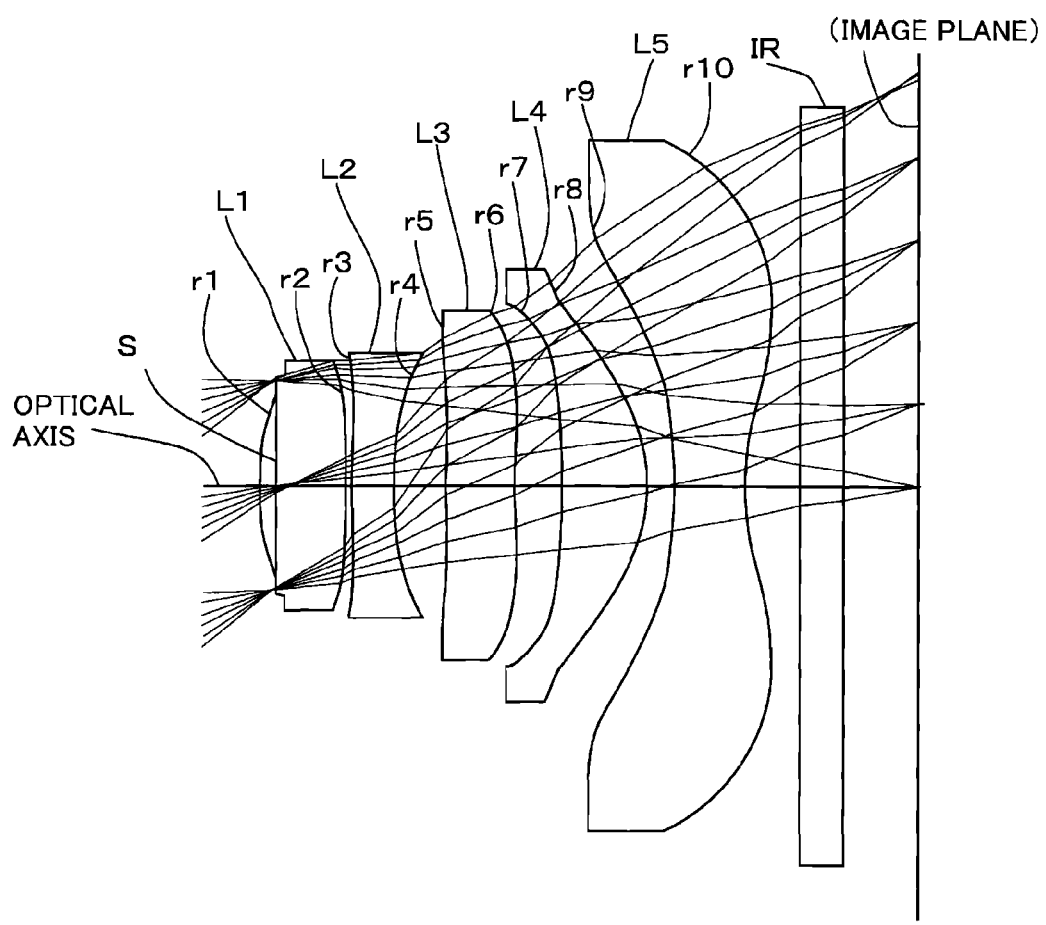
FIG. 11 is a sectional view of an imaging lens unit according to Example 6 of the invention.

FIG. 10 includes graphs which show the spherical aberration (mm), astigmatism (field curvature) (mm), and distortion (%) of the imaging lens unit in Example 5. As shown in FIG. 10, various aberrations can be corrected adequately with the imaging lens unit in Example 5. In addition, the equivalent air distance from the object side surface of the first lens L1 to the image plane is as short as 4.55 mm, which means that the imaging lens unit size is reduced in a preferable manner.

EXAMPLE 6

Table 6 shows the basic lens data of the imaging lens unit in Example 6.

TABLE 6

| | f = 3.7348 | Fno = 2.523 | ω = 37.27° | | |
|---|---|---|---|---|---|
| i | R | d | Nd | vd | |
| S (aperture stop) | ∞ | −0.12 | | | |
| 1* | 1.695 | 0.619 | 1.535 | 56.2 | |
| 2* | −5.187 | 0.025 | | | |
| 3* | 28.084 | 0.29 | 1.614 | 25.6 | |
| 4* | 2.032 | 0.37 | | | |
| 5* | 7.899 | 0.489 | 1.535 | 56.2 | |
| 6* | 7.618 | 0.332 | | | |
| 7* | −7.236 | 0.613 | 1.535 | 56.2 | |
| 8* | −0.902 | 0.183 | | | |
| 9* | −6.707 | 0.486 | 1.535 | 56.2 | |
| 10* | 1.058 | 0.4 | | | |
| 11 | ∞ | 0.3 | 1.517 | 64.2 | |
| 12 | ∞ | 0.536 | | | |
| IMA | ∞ | | | | |

| i | k | $A_4$ | $A_6$ | $A_8$ | $A_{10}$ | $A_{12}$ | $A_{14}$ |
|---|---|---|---|---|---|---|---|
| 1* | −1.543E+00 | 2.455E−02 | 1.481E−02 | −6.848E−02 | | | |
| 2* | 0.000E+00 | 1.026E−01 | −3.046E−01 | 1.204E−01 | | | |
| 3* | 0.000E+00 | 3.524E−02 | −9.636E−02 | −1.443E−01 | 1.924E−01 | | |
| 4* | −5.102E−01 | −7.046E−02 | 2.384E−01 | −3.299E−01 | 2.480E−01 | −6.192E−02 | |
| 5* | −3.498E+01 | −1.198E−01 | −5.589E−03 | 1.233E−01 | −9.417E−02 | 2.174E−02 | |
| 6* | 0.000E+00 | −8.138E−02 | −1.020E−01 | 1.061E−01 | −5.521E−02 | 9.084E−03 | |
| 7* | 0.000E+00 | 4.200E−02 | −6.957E−02 | −7.079E−02 | 7.988E−02 | −2.896E−02 | |
| 8* | −4.184E+00 | −1.332E−01 | 1.594E−01 | −1.711E−01 | 8.845E−02 | −1.520E−02 | |
| 9* | 0.000E+00 | −1.550E−01 | 5.556E−02 | −5.441E−03 | | | |
| 10* | −8.078E+00 | −1.204E−01 | 6.156E−02 | −2.281E−02 | 4.969E−03 | −5.872E−04 | 2.829E−05 | f3 = −399.233
f5 = −1.61057
f12 = 5.3654
f345 = 15.7079
EPD = 1.48

The values in the conditional expressions in Example 6 are given below:
f/f3=−0.0094
r5/r6=1.037
r5/f=1.339
f5/f=−0.431
r9/r10=−6.34
f12/f345=0.342
f/EPD–2.52

As apparent from the above, the imaging lens unit in Example 6 satisfies the conditional expressions (1) to (4) and (6) to (8).

Figure 12:
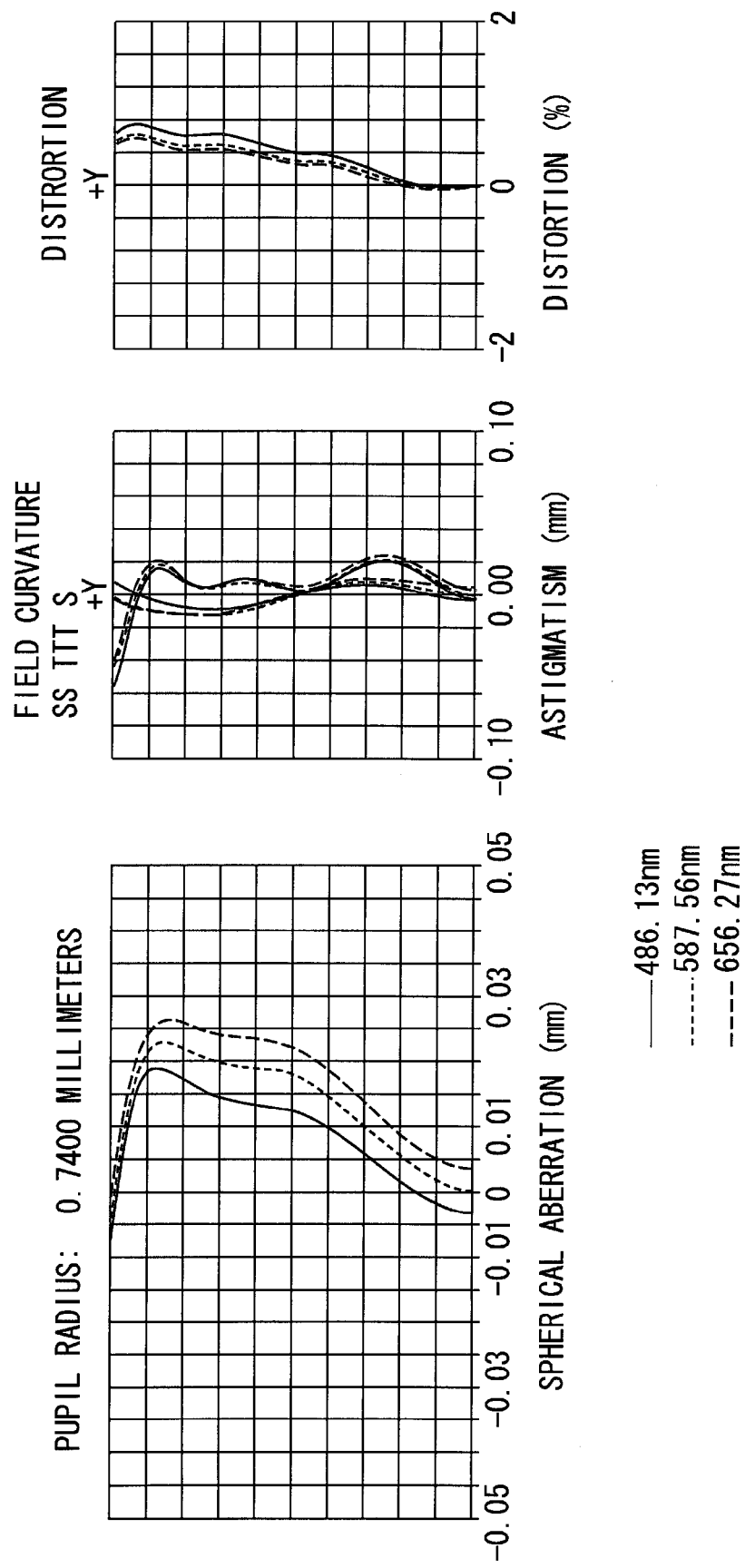
FIG. 12 shows various aberrations graphically according to Example 6.

FIG. 12 includes graphs which show the spherical aberration (mm), astigmatism (field curvature) (mm), and distortion (%) of the imaging lens unit in Example 6. As shown in FIG. 12, various aberrations can be corrected adequately with the imaging lens unit in Example 6. In addition, the equivalent air distance from the object side surface of the first lens L1 to the image plane is as short as 4.54 mm, which means that the imaging lens unit size is reduced in a preferable manner.

Therefore, when the imaging lens units according to these embodiments are used in the imaging optical systems of cellular phones, digital still cameras, PDAs, security cameras, on-board cameras, network cameras and the like, both performance enhancement and size reduction of their cameras can be achieved.

According to the present invention, the imaging lens unit provides both miniaturization and the ability to correct aberrations adequately, namely it is possible to provide a compact imaging lens unit capable of correcting various aberrations adequately at low cost.

What is claimed is:

1. An imaging lens unit for a solid-state image sensor, comprising:
   an aperture stop;
   a first lens with positive refractive power having convex surface facing an object side;

a second lens with negative refractive power having a convex surface facing the object side near an optical axis;

a third lens with negative refractive power having a convex surface facing the object side near the optical axis;

a fourth lens as a meniscus lens with positive refractive power having a convex surface facing an image side near the optical axis; and a fifth lens with negative refractive power having a concave surface facing the image side near the optical axis, wherein the aperture stop and the lenses are arranged in order from the object side to the image side; and wherein the third lens has aspheric surfaces whose power changes from negative to positive in a remoter area from the optical axis or peripheral area.

2. The imaging lens unit according to claim 1, wherein a conditional expression (1) given below is satisfied wherein f denotes focal length of the whole lens system and f3 denotes focal length of the third lens:

$$-0.05 < f/f3 < 0.0 \tag{1}$$

3. The imaging lens unit according to claim 2, wherein conditional expressions (2) and (3) given below are satisfied wherein r5 denotes curvature radius of an object side surface of the third lens and r6 denotes curvature radius of an image side surface of the third lens:

$$0.9 < r5/r6 < 1.2 \tag{2}$$

$$1.2 < r5/f \tag{3}$$

4. The imaging lens unit according claim 3, wherein a conditional expression (4) given below is satisfied wherein f5 denotes focal length of the fifth lens and f denotes focal length of the whole lens system:

$$-0.8 < f5/f < -0.3 \tag{4}$$

5. The imaging lens unit according to claim 4, wherein a conditional expression (5) given below is satisfied wherein r9 denotes curvature radius of an object side surface of the fifth lens and r10 denotes curvature radius of an image side surface of the fifth lens:

$$5.0 < r9/r10 < 10.0 \tag{5}$$

6. The imaging lens unit according to claim 4, wherein a conditional expression (6) given below is satisfied wherein r9 denotes curvature radius of an object side surface of the fifth lens and r10 denotes curvature radius of an image side surface of the fifth lens:

$$-7.0 < r9/r10 < -2.0 \tag{6}$$

7. The imaging lens unit according to claim 2, wherein a conditional expression (4) given below is satisfied wherein f5 denotes focal length of the fifth lens and f denotes focal length of the whole lens system:

$$-0.8 < f5/f < -0.3 \tag{4}$$

8. The imaging lens unit according to claim 7, wherein a conditional expression (5) given below is satisfied wherein r9 denotes curvature radius of an object side surface of the fifth lens and r10 denotes curvature radius of an image side surface of the fifth lens:

$$5.0 < r9/r10 < 10.0 \tag{5}$$

9. The imaging lens unit according to claim 7, wherein a conditional expression (6) given below is satisfied wherein r9 denotes curvature radius of an object side surface of the fifth lens and r10 denotes curvature radius of an image side surface of the fifth lens:

$$-7.0 < r9/r10 < -2.0 \tag{6}$$

10. The imaging lens unit according claim 1, wherein a conditional expression (4) given below is satisfied wherein f5 denotes focal length of the fifth lens and f denotes focal length of the whole lens system:

$$-0.8 < f5/f < -0.3 \tag{4}$$

11. The imaging lens unit according to claim 10, wherein a conditional expression (5) given below is satisfied wherein r9 denotes curvature radius of an object side surface of the fifth lens and r10 denotes curvature radius of an image side surface of the fifth lens:

$$5.0 < r9/r10 < 10.0 \tag{5}$$

12. The imaging lens unit according to claim 10, wherein a conditional expression (6) given below is satisfied wherein r9 denotes curvature radius of an object side surface of the fifth lens and r10 denotes curvature radius of an image side surface of the fifth lens:

$$-7.0 < r9/r10 < -2.0 \tag{6}$$

13. The imaging lens unit according to claim 1, wherein a conditional expression (7) given below is satisfied wherein f12 denotes composite focal length of the first lens and the second lens and f345 denotes composite focal length of the third lens, the fourth lens, and the fifth lens:

$$0.1 < f12/f345 < 0.5 \tag{7}$$

14. The imaging lens unit according to claim 13, wherein a conditional expression (8) given below is satisfied wherein EPD denotes diameter of the aperture stop and f denotes focal length of the whole lens system:

$$2.0 < f/EPD < 2.8 \tag{8}$$

* * * * *